US008327103B1

(12) United States Patent
Can et al.

(10) Patent No.: US 8,327,103 B1
(45) Date of Patent: Dec. 4, 2012

(54) SCHEDULING DATA RELOCATION ACTIVITIES USING CONFIGURABLE FAIRNESS CRITERIA

(75) Inventors: Khang Can, Framingham, MA (US); Xiangping Chen, Shrewsbury, MA (US); Monica Chaudhary, South Grafton, MA (US); Kevin Bangyen Jiang, Waltham, MA (US); Qin Tao, Hopkinton, MA (US); Mark Ku, Wollaston, MA (US)

(73) Assignee: EMC Corporation, Hopkinton, MA (US)

( * ) Notice: Subject to any disclaimer, the term of this patent is extended or adjusted under 35 U.S.C. 154(b) by 359 days.

(21) Appl. No.: 12/824,380

(22) Filed: Jun. 28, 2010

(51) Int. Cl.
*G06F 12/00* (2006.01)
(52) U.S. Cl. .......................................... 711/165; 710/39
(58) Field of Classification Search .................. 711/165; 710/39
See application file for complete search history.

(56) References Cited

U.S. PATENT DOCUMENTS

| 6,985,794 B1* | 1/2006 | Conboy et al. | 700/214 |
| 8,112,566 B2* | 2/2012 | Chang | 710/74 |
| 2005/0223133 A1* | 10/2005 | Sen et al. | 710/22 |

* cited by examiner

*Primary Examiner* — John Lane
(74) *Attorney, Agent, or Firm* — BainwoodHuang

(57) ABSTRACT

A storage processor of a data storage system includes a data relocation task scheduler that provides system limit control on the execution of data relocation requests. The data relocation task scheduler also provides fairness and concurrency limit enforcement by scheduling relocation requests from different provisioning domains, such as storage pools, in a fair manner. For example, the data relocation task scheduler includes stackable sets of pending task queues that store incoming data relocation requests. The data relocation task scheduler applies an iteration scheme to remove data relocation requests from the pending task queues thereby providing scheduling fairness among the queues and among the different provisioning domains within the data storage system. The data relocation task scheduler is configured to receive updated policies that control both system-wide data relocation resource consumption and scheduling fairness among the queues during operation and dynamically adjust current policies with the updated policies.

21 Claims, 3 Drawing Sheets

100 

102 RETRIEVE A DATA RELOCATION REQUEST FROM A SELECTED PENDING TASK QUEUE OF A SET OF PENDING TASK QUEUES, EACH PENDING TASK QUEUE OF THE SET OF PENDING TASK QUEUES HAVING AN ASSOCIATED, DISTINCT GROUPING PROPERTY AND EACH PENDING TASK QUEUE OF THE SET OF PENDING TASK QUEUES HAVING A SET OF ASSIGNED DATA RELOCATION REQUESTS, THE GROUPING PROPERTY OF EACH PARTICULAR PENDING TASK QUEUE CORRESPONDING TO A DATA RELOCATION REQUEST GROUPING PROPERTY OF EACH DATA RELOCATION REQUEST ASSIGNED TO THAT PARTICULAR PENDING TASK QUEUE

104 APPLY AN ACCEPTANCE THRESHOLD TO THE DATA RELOCATION REQUEST, THE ACCEPTANCE THRESHOLD DEFINING A LIMIT TO THE DATA RELOCATION REQUESTS PROCESSED BY THE STORAGE PROCESSOR

106 WHEN THE DATA RELOCATION REQUEST MEETS THE ACCEPTANCE THRESHOLD, FORWARD THE DATA RELOCATION REQUEST TO AN ONGOING TASK QUEUE FOR EXECUTION OF THE DATA RELOCATION REQUEST, OTHERWISE MAINTAIN THE DATA RELOCATION REQUEST IN THE SELECTED PENDING TASK QUEUE OF THE SET OF PENDING TASK QUEUES

FIG. 3

SCHEDULING DATA RELOCATION ACTIVITIES USING CONFIGURABLE FAIRNESS CRITERIA

BACKGROUND

A typical data storage system stores and retrieves data for one or more external host devices. Conventional data storage systems typically include a storage processor and an array of disk drives electrically coupled to the storage processor. The storage processor includes one or more ports, such as Fibre Channel ports, that allow the host devices to connect to the storage processor and is typically configured to perform load and store operations on the array of disk drives on behalf of the host devices.

Within the storage system, the disk drives of the array are grouped into discrete sets called RAID groups or Storage Pools. Each RAID group includes slices or partitions organized into multiple logical units of (LUNs). In conventional storage systems, such as Fibre Channel storage systems, the storage processor is configured to monitor performance of the LUNs which are serviced by the array of disk drives. For example, the storage processor monitors the disk utilization and LUN utilization associated with the set of LUNs serviced by the system. As a result of such monitoring, the storage processor generates a report that includes performance information related to the storage system's LUNs and RAID groups. In order to optimize operation of the array of disk drives, a system operator can review the report and make decisions as to the migration of certain data or LUNs to different RAID Groups or Storage Pools serviced by the data storage system based upon the relative usage of the LUNs disk utilization.

For example, assume the RAID groups include a Fibre Channel (FC) array of disk drives and a Serial Advanced Technology Attachment (SATA) array of disk drives. An FC array is characterized as typically having relatively better performance than a SATA array while a SATA array is characterized as typically having a relatively larger storage capacity than the FC array. In such an arrangement, when the system operator detects that a particular slice of the SATA RAID group experiences a relatively large amount of activity (e.g., a hot slice), in order to optimize operation of the data storage system, the system operator can issue a command to the storage processor to move the data from the relatively low-performance SATA slice to a slice in the relatively high-performance FC group. Additionally, when the system operator detects that a particular slice of the FC RAID group experiences a relatively low amount of activity (e.g., a cold slice), in order to optimize operation of the data storage system, the system operator can issue a command to the storage processor to move the data from the relatively high-performance FC slice to a slice in the SATA group.

SUMMARY

Conventional data storage systems are configured to relocate data among different types of RAID groups in order to optimize system performance. However, data relocation activities can consume storage system resources and compete with the storage processor's input/output (I/O) activity for backend I/O bandwidth, which can degrade the overall performance of the storage processor. For example, with respect to data relocation scheduling, conventional data storage processors lack the ability to provide an overall system level scheduling limit. With the lack of a system level scheduling limit, in the case where the data storage system provisions a relatively large number of LUNs from the RAID groups, the storage processor can receive a large number of slice relocation tasks scheduled to run concurrently. In such a situation, as the storage processor relocates concurrent slices, such relocation can monopolize I/O resources of the storage processor. Additionally, with respect to data relocation scheduling, conventional data storage processors lack the ability to provide an underlying RAID group level scheduling limit. The lack of a relocation limit against critical performance resources, such as RAID groups, can result in overutilization of those resources by the storage processor, thus resulting in degradation of the storage processor's I/O performance.

By contrast to conventional data relocation scheduling, embodiments of the present invention relate to scheduling data relocation activities using configurable fairness criteria. In one arrangement, a storage processor of a data storage system includes a data relocation task scheduler that provides system limit control on the execution of data relocation requests based on identified resource bottlenecks, such as RAID groups. The data relocation task scheduler also provides fairness and concurrency limit enforcement by scheduling relocation requests from different provisioning domains, such as storage pools, in a fair manner. For example, the data relocation task scheduler includes stackable sets of pending task queues that store incoming data relocation requests. The data relocation task scheduler applies an iteration scheme, such as a round-robin iteration scheme, to remove data relocation requests from the pending task queues thereby providing scheduling fairness among the queues and, as a result, among the different provisioning domains within the data storage system. By limiting the overall slice relocations in a data storage system and concurrent slice relocations in a RAID group and a host LUN, the data relocation task scheduler minimizes performance degradation of the storage processor during operation.

Additionally, the data relocation task scheduler is configured to receive updated policies that control both system-wide data relocation resource consumption and scheduling fairness among the queues during operation and dynamically adjust current policies with the updated policies. With such an arrangement the data relocation task scheduler allows for data storage system performance tuning on-the-fly and without requiring the addition of updated software or a reboot of the data storage processor In one arrangement, embodiments of the invention relate to a method for scheduling a data relocation activity in a data storage system. The method includes retrieving, by a storage processor, a data relocation request from a selected pending task queue of a set of pending task queues, each pending task queue of the set of pending task queues having an associated, distinct grouping property and each pending task queue of the set of pending task queues having a set of assigned data relocation requests, the grouping property of each particular pending task queue corresponding to a data relocation request grouping property of each data relocation request assigned to that particular pending task queue. The method includes applying, by the storage processor, an acceptance threshold to the data relocation request, the acceptance threshold defining a limit to a number of data relocation requests processed by the storage processor. The method includes, when the data relocation request meets the acceptance threshold, forwarding, by the storage processor, the data relocation request to an ongoing task queue for execution of the data relocation request, otherwise maintaining the data relocation request in the selected pending task queue of the set of pending task queues.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 is a flowchart that illustrates a procedure performed by a storage processor of the data storage environment of FIG. 1.

DETAILED DESCRIPTION

Embodiments of the present invention relate to scheduling data relocation activities using configurable fairness criteria. In one arrangement, a storage processor of a data storage system includes a data relocation task scheduler that provides system limit control on the execution of data relocation requests based on identified resource bottlenecks, such as RAID groups. The data relocation task scheduler also provides fairness and concurrency limit enforcement by scheduling relocation requests from different provisioning domains, such as storage pools, in a fair manner. For example, the data relocation task scheduler includes stackable sets of pending task queues that store incoming data relocation requests. The data relocation task scheduler applies an iteration scheme, such as a round-robin iteration scheme, to remove data relocation requests from the pending task queues thereby providing scheduling fairness among the queues and, as a result, among the different provisioning domains within the data storage system. By limiting the overall slice relocations in a data storage system and concurrent slice relocations in a RAID group and a host LUN, the data relocation task scheduler minimizes performance degradation of the storage processor during operation.

Figure 1:
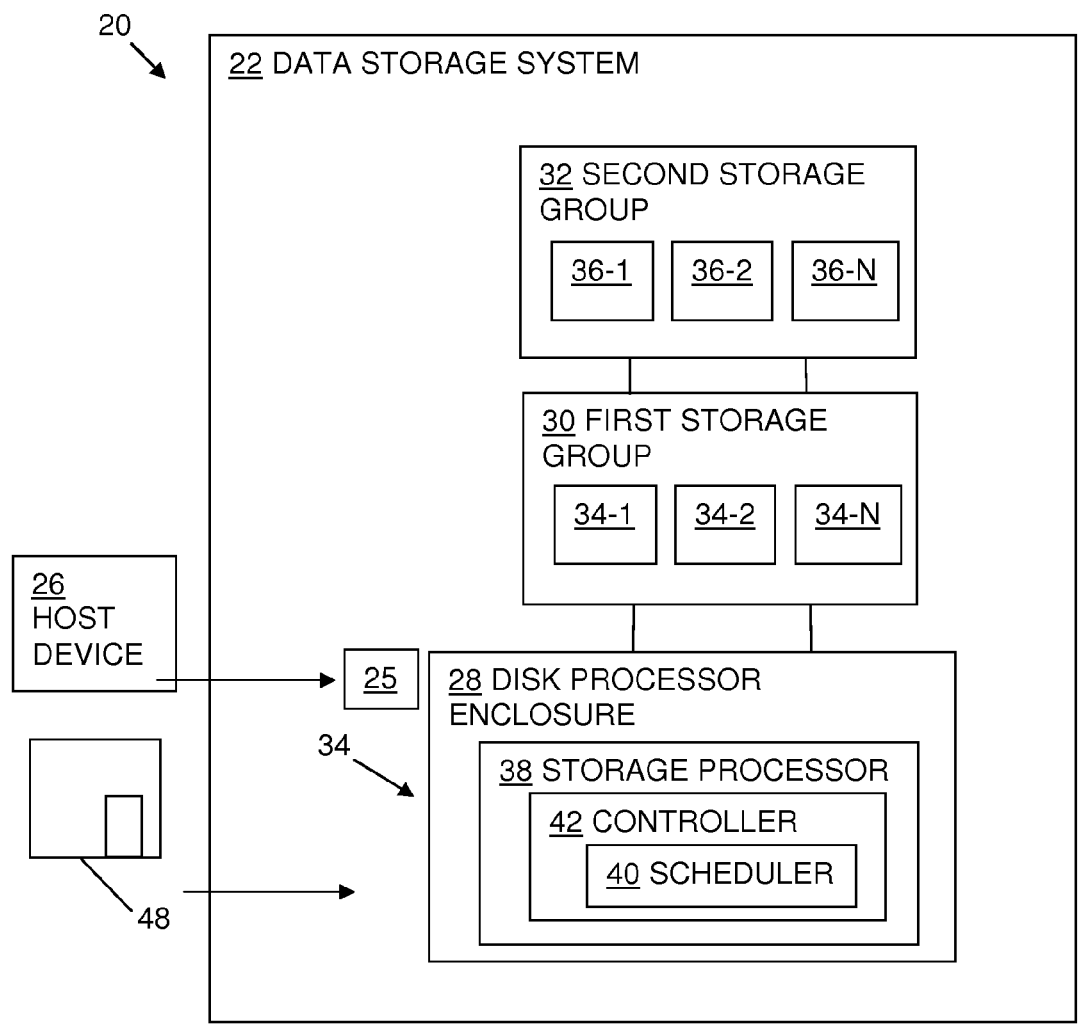
FIG. 1 illustrates a schematic representation of a data storage environment, according to one embodiment.

FIG. 1 illustrates an example arrangement of a data storage environment 20, such as used by an enterprise. As shown, the data storage environment 20 includes a data storage system 22 and a host device 26, such as a computerized device having a memory and a processor, disposed in electrical communication with the data storage system 22.

The data storage system 22, in one arrangement, includes a disk processor enclosure 28, a first storage group 30 such as a first RAID group or storage pool disposed in electrical communication with the disk processor enclosure 28, and a second storage group 32 such as a second RAID group or storage pool, disposed in electrical communication with the disk processor enclosure 28.

In one arrangement, the first storage group 30 includes an array of magnetic memory units, collectively 34. For example, the first storage group 30 can include several disk drives operable to store data received from the host device 26 or to provide data requested from the host device 26. While the disk drives can be identified in a variety of ways, in one arrangement, any number of the disk drives of the array, a portion of a particular disk drive of the array, or one or more virtual hard disk partitions, is identified within the data storage system 22 by a logical unit number (LUN). While the first storage group 30 can be configured in a variety of ways, in one arrangement, the first storage group 30 is configured as a Fibre Channel (FC) RAID group. With such a configuration, the LUNs of the FC RAID group 30 are characterized by a relatively high performance requirement, relatively moderate storage capacities and, a relatively moderate cost per disk, thereby resulting in a relatively moderate cost per gigabyte of storage.

In one arrangement, the second storage group 32 includes an array of magnetic memory units, collectively 36, such as disk drives, operable to store data received from the host device 26 or to provide data requested from the host device 26. While the disk drives can be identified in a variety of ways, in one arrangement, any number of the disk drives of the array, a portion of a particular disk drive of the array, or one or more virtual hard disk partitions, is identified within the data storage system 22 by a logical unit number (LUN). While the second storage group 32 can be configured in a variety of ways, in one arrangement, the second storage group 32 is configured as a Serial Advanced Technology Attachment (SATA) RAID groups. With such a configuration, the LUNs of the SATA RAID group 32 are characterized by a relatively lower performance requirement, relatively higher storage capacities relative to the FC RAID group.

The disk processor enclosure 28 includes one or more controllers or storage processors, collectively referred to as storage processor 36, configured to control certain functions of the data storage system 22. For example, the storage processor 34 is configured to perform load and store operations on the first storage group 30 on behalf of the host device 26. In one arrangement, the storage processor 36 is also configured to receive data relocation requests 25 from the host device 26. For example, in response to a report generated by the storage processor 36 regarding the performance of the array of disk drives of first and second storage groups 30, 32, a system operator can provide one or more data relocation requests 25 to the storage processor 36. Based on the performance of the arrays, the relocation requests 25 can either direct the storage processor 36 move data from a slice in the SATA group 32 to a slice in the FC group 30 or to move the data from a slice in the FC group 30 to a slice in the SATA group 32.

Also as illustrated in FIG. 1, the storage processor 38 includes a data relocation task scheduler 40, referenced as task scheduler 40 herein. The task scheduler 40 is configured to control or limit the number of data relocation requests executed by the storage processor 36 at a given time (e.g., provide a concurrency limit to the execution of data relocation requests) and to schedule relocation requests from different storage groups 30, 32 in a fair manner. By effectively throttling data relocation activity undertaken by the storage processor 38, the task scheduler 40 minimizes interference with the storage processor's I/O to enhance performance of data storage system 22.

In one arrangement, the storage processor 38 includes a controller 42, such as a memory and a processor, disposed in electrical communication with a corresponding communications interface. In one arrangement, the controller 42 stores a data relocation task scheduler application. The data relocation task scheduler application installs on the storage processor 38 from a computer program product 48. In some arrangements, the computer program product 48 is available in a standard off-the-shelf form such as a shrink wrap package (e.g., CD-ROMs, diskettes, tapes, etc.). In other arrangements, the computer program product 48 is available in a different form, such downloadable online media. For example, the data relocation task scheduler application can be downloaded from a web server on the data storage system 22 via a web browser. When performed on the controller 42 of the storage processor 38, the data relocation task scheduler application causes the storage processor 38 to limit the overall number of slice relocations occurring in the data storage system 22 and the number of concurrent slice relocations occurring for a given RAID group.

Figure 2:
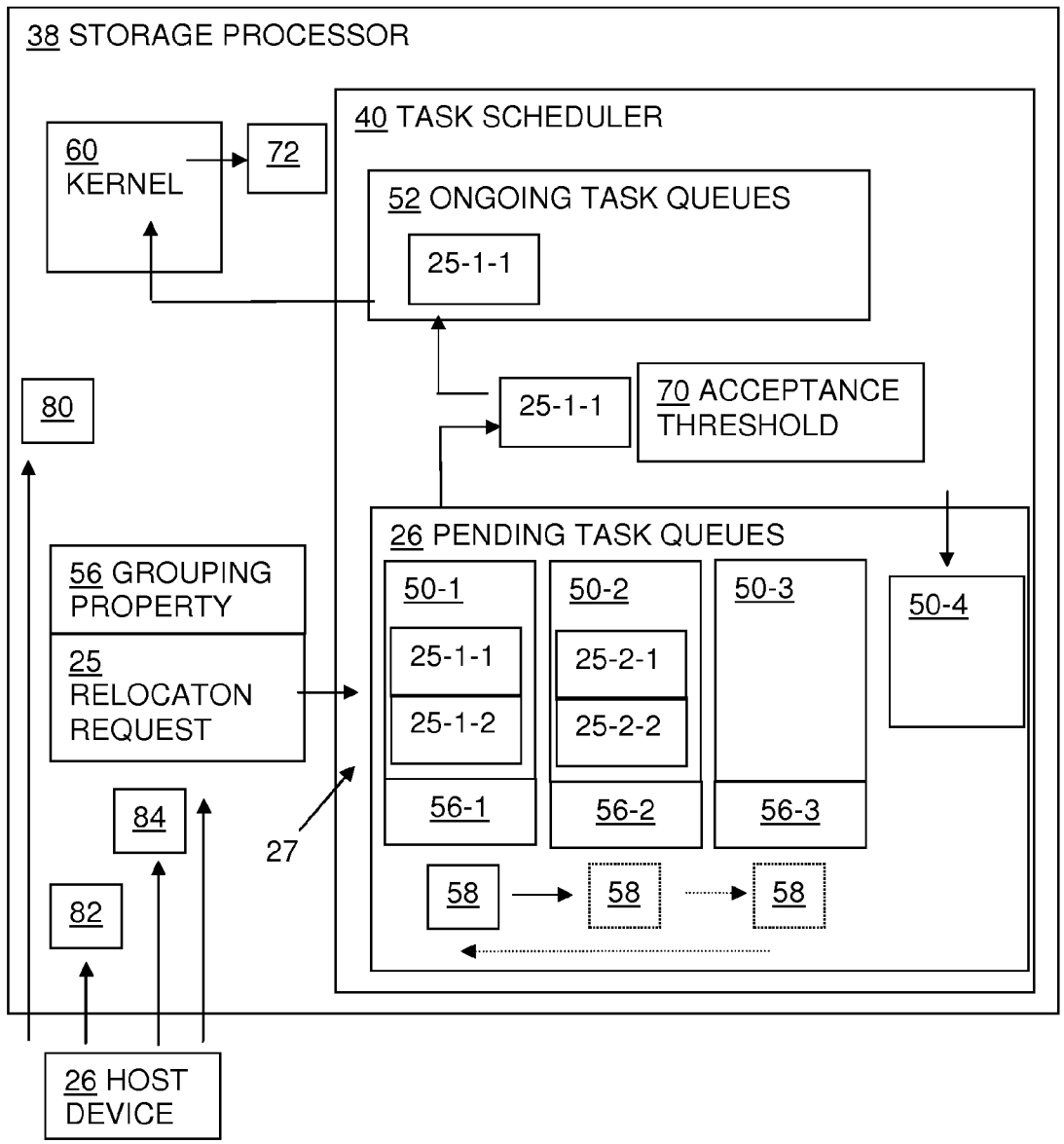
FIG. 2 illustrates a schematic representation of a storage processor of the data storage environment of FIG. 1, according to one embodiment.

FIG. 2 illustrates a schematic representation of the storage processor 38 and the task scheduler 40, according to one embodiment. As illustrated, the task scheduler 40 includes a set of pending task queues 50 and a set of ongoing task queues 52. By utilizing the set of pending task queues 50 and the set of ongoing task queues 52, the task scheduler 40 controls the frequency of data relocation activity undertaken by the storage processor 38.

The pending task queues 50 are configured to store relocation requests 25 received from the host device 26. For example, as illustrated in FIG. 2, the set of pending task queues 50 includes three distinct pending task queues 50-1, 50-2, 50-3, where each pending task queue 50-1, 50-2, 50-3 stores a corresponding set of received relocation requests 27. In one arrangement, the task scheduler 40 is configured to group relocation requests 25 received from the host device 26 into each of the separate pending task queues 50-1, 50-2, 50-3 based upon a correspondence between a data relocation request grouping property 54 associated with a received data relocation request 25 and a grouping property 56 of each pending task queue of the set of pending task queues 50.

For example, assume the first pending task queue 50-1 is configured to store relocation requests 25 associated with the first storage group 30 as indicated by the grouping property 56-1, the second pending task queue 50-2 is configured to store relocation requests 25 associated with the second storage group 32 as indicated by the grouping property 56-2, and the third pending task queue 50-3 is configured to store relocation requests 25 associated with a third storage group as indicated by the grouping property 56-3. In use, as the task scheduler 40 receives a relocation request 25 from the host device 26, as will be described in detail below, the task scheduler 40 compares the data relocation request grouping property 54 of the relocation request 25 to each of the grouping properties 26 associated with the pending task queues 50-1, 50-2, 50-3. Based upon the comparison, when the task scheduler 40 detects a correspondence between the data relocation request grouping property 54 of the relocation request 25 and a grouping property 26 of the pending task queues 50-1, 50-2, 50-3, the task scheduler 40 allocates the relocation request 25 to the corresponding pending task queue 50-1, 50-2, 50-3. For example, assume the data relocation request grouping property 54 indicates that the relocation request 25 pertains to the first storage group 30. Based upon a comparison of the data relocation request grouping property 54 and the grouping property 26 of the pending task queues 50-1, the task scheduler 40 inserts the relocation request 25 into the first pending task queue 50-1.

In one arrangement, based upon the comparison, the task scheduler 40 may fail to detect a correspondence between the data relocation request grouping property 54 of the relocation request 25 and a grouping property 26 of the pending task queues 50-1, 50-2, 50-3. For example, assume the data relocation request grouping property 54 indicates that the relocation request 25 pertains to a fourth storage group (not shown in FIG. 1). Based upon the comparison of the data relocation request grouping property 54 and each of the grouping properties 26 associated with the pending task queues 50-1, 50-2, 50-3, the task scheduler 40 can detect an absence of a pending task queue related to a fourth storage group. In such a case, in one arrangement, the task scheduler 40 creates a pending task queue 50-4 associated with the data relocation request grouping property 26 (i.e., fourth storage group) of the received data relocation request 25. The task scheduler 40 then allocates the data relocation request 25 to the created pending task queue 50-4 of the set of pending task queues 50.

By grouping relocation requests 25 into separate pending task queues 50-1, 50-2, 50-3 based upon a grouping property 54, the task scheduler 40 allows the all of the relocation requests 25 stored by the pending task queues 50-1, 50-2, 50-3 to be attended to in a fair manner. To provide such fairness, in one arrangement, the task scheduler 40 is configured to select relocation request 25 from each the pending task queues 50-1, 50-2, 50-3 according to an iteration scheme, such as an iterative round-robin scheme. For example, the task scheduler 40 is configured with a pending queue iteration cursor 58 that iteratively advances across each of the pending task queues 50-1, 50-2, 50-3 during operation. As will be described in detail below, as the task scheduler 40 advances the cursor 58 to each of the pending task queues 50-1, 50-2, 50-3, the task scheduler 40 schedules a relocation request 25 stored in the corresponding pending task queues 50-1, 50-2, 50-3 for further processing. In the case where each of the pending task queues 50-1, 50-2, 50-3 corresponds with a particular storage group, scheduling the relocation requests 25 in the round-robin manner minimizes favoring of any particular storage group, thereby providing a level of fairness to the scheduling of the requests 25.

The ongoing task queues 52 are configured to store relocation requests 25 received from the pending task queues 50 prior to being processed by a task executor kernel 60. In one arrangement, the ongoing task queues 52 store each relocation request 25 until either the task executor kernel 60 completes the data relocation as indicated in a particular relocation requests 25 or a system operator cancels processing of a particular relocation request 25.

With the relocation requests 25 having been allocated to particular pending task queues 50, the task scheduler 40 of the storage processor 38 can schedule data relocation activities related to the relocation requests. FIG. 3 is a flowchart 100 that illustrates a procedure performed by the storage processor 38 for scheduling a data relocation activity in the data storage system 22.

In step 102, the storage processor 38 retrieves a data relocation request 25 from a selected pending task queue of a set of pending task queues 50, each pending task queue of the set of pending task queues 50 having an associated, distinct grouping property 56 and each pending task queue of the set of pending task queues 50 having a set of assigned data relocation requests 25, the grouping property 56 of each particular pending task queue corresponding to a data relocation request grouping property 54 of each data relocation request 25 assigned to that particular pending task queue. For example, during operation, the task scheduler 40 of the storage processor 38 selects a relocation request 25 from a pending task queue 50 identified by the pending queue iteration cursor 58. As illustrated in FIG. 2, the cursor 58 identifies the first pending task queue 50-1 as being the appropriate pending task queue 50 for selection of a relocation request 25. While the storage processor 38 can select any relocation request 25 within the first pending task queue 50-1 for further processing, in one arrangement, the storage processor 38 selects the first relocation request 25-1-1 from the first pending task queue 50-1 where the relocation requests 25 are ordered in the pending task queue in a first-in, first out (FIFO) order.

Returning to FIG. 3, in step 104, the storage processor 38 applies an acceptance threshold 70 to the data relocation request 25-1-1, the acceptance threshold 70 defining a limit to the data relocation requests 25 processed by the storage processor 38. In one arrangement, in order to minimize performance degradation of the storage processor 38 during operation, the acceptance threshold 70, as illustrated in FIG. 2, provides system limit control on the execution of a total number of data relocation requests 25.

For example, in one arrangement the acceptance threshold 70 is configured as a system level limit, or value, of the total number of data relocation requests 25 pending in the ongoing task queue 52. In such an arrangement, when applying the acceptance threshold 70 to the data relocation request 25-1-1, the storage processor 38 compares the total number of data relocation requests 25 pending in the ongoing task queue 52 to the acceptance threshold 70. In another arrangement, the acceptance threshold 70 is configured as a total number of data relocation requests 25 in the ongoing task queue 52 having a grouping property 54 corresponding to the grouping property 56-1 of the retrieved data relocation request 25-1-1. For example, assume the acceptance threshold 70 is configured to limit the total number of data relocation requests 25 pending in the ongoing task queues 52 to five data relocation requests 25 per pending task queue 50-1, 50-2, 50-3 (i.e., the ongoing task queue can include up to five data relocation requests 25 from the first pending task queue 50-1, up to five data relocation requests 25 from the second pending task queue 50-2, and up to five data relocation requests 25 from the third pending task queue 50-3). Further assume that the storage processor 38 has selected the data relocation request 25-1-1 from the first pending task queue 50-1 for further processing, where the data relocation request 25-1-1 is associated with the first grouping property 26-1. In such an arrangement, when applying the acceptance threshold 70 to the data relocation request 25-1-1, the storage processor 38 compares the total number of data relocation requests 25 in the ongoing task queue 52 having the grouping property 56-1 with the acceptance threshold 70.

Returning to FIG. 3, in step 106, when the data relocation request 25 meets the acceptance threshold 70, the storage processor 38 forwards the data relocation request 25 to an ongoing task queue 52 for execution of the data relocation request 25, otherwise the storage processor 38 maintains the data relocation request 25 in the selected pending task queue of the set of pending task queues 50.

For example, when the acceptance threshold 70 is configured as a system level limit of the total number of data relocation requests 25 pending in the ongoing task queue 52, in the case where the storage processor 38 detects the total number of data relocation requests 25 within the ongoing task queue 52 falls below the acceptance threshold 70, the storage processor 38 forwards the data relocation request 25-1-1 to the ongoing task queue 52 for execution. However, if the storage processor 38 detects the total number of data relocation requests 25 within the ongoing task queue 52 does not fall below the acceptance threshold 70, the storage processor 38 maintains the data relocation request 25-1-1 in the selected pending task queue 50-1 and selects the next data relocation request 25-1-2 from the pending task queue 50-1 for processing.

In another example, assume the case where the acceptance threshold 70 is configured as a total number of data relocation requests 25 in the ongoing task queue 52 having a grouping property 54 corresponding to the grouping property 56-1 of the retrieved data relocation request 25-1-1. In the case where the total number of data relocation requests 25 in the ongoing task queue 52 having the grouping property 56-1 falls below five relocation tasks 25 (e.g., in the example provided above), the storage processor 38 forwards the data relocation request 25-1-1 to the ongoing task queue 52 for execution. However, if the storage processor 38 detects the total number of data relocation requests 25 within the ongoing task queue 52 does not fall below the acceptance threshold 70, the storage processor 38 maintains the data relocation request 25-1-1 in the selected pending task queue 50-1 and selects the next data relocation request 25-1-2 from the pending task queue 50-1 for processing.

In the case where the storage processor 38 forwards the data relocation request 25-1-1 to the ongoing task queue 52, the storage processor 38 is configured to continue to iteratively retrieve data relocation requests 25 from the set of pending task queues 50 and apply the acceptance threshold 70 to the retrieved data relocation request in a round-robin manner. For example with respect to FIG. 2, following the delivery of the data relocation request 25-1-1 to the ongoing task queue 52, the storage processor 38 advances the cursor 58 to the second pending task queue 50-2 where the second pending task queue iteratively follows the first pending task queue 50-1. The storage processor 38 then selects a data relocation request 25-2-1 from the second pending task queue 50-2 and applies the acceptance threshold 70 to the data relocation request 25-2-1. The storage processor 38 continues this process until either all of the pending task queues 50-1 through 50-3 have been checked and there are no more data relocation requests 25 or there are no more data relocation requests 25 that can pass the acceptance threshold 70 or until the set of ongoing task queues 52 has reached a capacity limit. By limiting the overall number of data relocation requests 25 processed in the data storage system 22 as well as the number of data relocation requests 25 related to a particular storage group, the storage processor 38 (e.g., the data relocation task scheduler 40) minimizes performance degradation of the storage processor 38 during operation.

Also in the case where the storage processor 38 forwards the data relocation request 25-1-1 to the ongoing task queue 52, the storage processor 38 is configured to execute the data relocation request 25-1-1. For example, with reference to FIG. 2, during execution, the task scheduler 40 selects a data relocation request, such as data relocation request 25-1-1 from the ongoing task queue 52. In one arrangement, the task scheduler 40 then forwards the selected data relocation request 25-1-1 to the task executor kernel 60 for execution. Once the task executor kernel 60 processes the data relocation request 25-1-1 (e.g., by moving data associated with the request within the data storage system 22) the task executor kernel 60 forwards a completion criterion 72, such as a completion notification, to the task scheduler 40. In response to receiving the completion criterion 72, task scheduler 40 removes the data relocation request 25-1-1 from the ongoing task queue 52. Once the task manager 40 detects the removal of a data relocation request 25-1-1 from the ongoing task queue 52, the task scheduler 40 continues to select data relocation request 25 from the ongoing task queue and forward the selected requests 25 to the task executor kernel 60 for processing.

In one arrangement, in order to provide the storage processor 38 with a level of flexibility in scheduling data relocation requests for execution, the acceptance threshold 70 is configured to be changed dynamically during operation. For example, with reference to FIG. 2, assume the acceptance threshold 70 is configured to limit the total number of data relocation requests 25 pending in the ongoing task queues 52 to five data relocation requests 25 per pending task queue 50-1, 50-2, 50-3. In the case where a system operator wants to change the acceptance threshold 70 to limit the total number of data relocation requests 25 pending in the ongoing task queues 52 to ten data relocation requests 25 per pending task queue 50-1, 50-2, 50-3, the system operator provides a modified acceptance threshold 80 to the storage processor 38. Upon receipt, the storage processor 38 applies the modified acceptance threshold 80 to data relocation requests retrieved from the pending task queues 50. Accordingly, with such a configuration, a system operator can modify the acceptance threshold 70 at any time and without being required to reboot or restart the storage processor 38.

While various embodiments of the invention have been particularly shown and described, it will be understood by those skilled in the art that various changes in form and details may be made therein without departing from the spirit and scope of the invention as defined by the appended claims.

For example, as indicated above, the data relocation task scheduler 40 is configured to schedule execution of data relocation request 25 in a data storage system 22. Such indication is by way of example only. In one arrangement, the task scheduler 40 is built on a general task scheduling framework that can be used to schedule any type of task that requires fairness and concurrency limits.

In another example, as described above, in response to a report generated by the storage processor 36 regarding the performance of the array of disk drives of first and second storage groups 30, 32, a system operator can provide one or more data relocation requests 25 to the storage processor 36. Such description is by way of example only. In one arrangement, an auto-tiering policy engine associated with the storage processor 38 collects slice I/O statistics, computes data slice temperatures (i.e., relative activity/inactivity), and generates data relocation decisions for each storage group based upon slice I/O activity. Based upon the data relocation decisions, the storage processor receives data relocation requests 25 from the storage groups and schedules data relocation execution.

In another example, as indicated above, as illustrated in FIG. 2, the set of pending task queues 50 includes three distinct pending task queues 50-1, 50-2, 50-3. Such indication is by way of example only. It should be understood that the set of pending task queues 50 can include any number of distinct pending task queues.

In one arrangement, as recited above, in order to provide the storage processor 38 with a level of flexibility in scheduling data relocation requests for execution, the acceptance threshold 70 is configured to be changed dynamically during operation. Such description is by way of example only. In one arrangement, aspects of the grouping properties 56 of the pending task queues 50 can be changed dynamically during operation. For example, as described above, the task scheduler 40 is configured to group relocation requests 25 received from the host device 26 into each of the separate pending task queues 50-1, 50-2, 50-3 based upon a correspondence between a data relocation request grouping property 54 associated with a received data relocation request 25 and a grouping property 56 of each pending task queue of the set of pending task queues 50. In one arrangement, the system operator can provide a modified grouping property 82 to the task scheduler 40 to dynamically adjust the way in which the received data relocation request 25 are partitioned into separate queues. For example, assume the system operator provides the modified grouping property 82 to the task scheduler 40. Once received, the task scheduler 40 associates the modified grouping property 82 with each of the separate pending task queues 50-1, 50-2, 50-3 and utilizes the modified grouping property 82 as a basis for separating received relocation requests 25 into particular task queues 50. or example, in such a configuration, the task scheduler 40 groups relocation requests 25 received from the host device 26 into each of the separate pending task queues 50-1, 50-2, 50-3 based upon a correspondence between a data relocation request grouping property 54 associated with a received data relocation request 25 and the modified grouping property 82 associated with each of the separate pending task queues 50-1, 50-2, 50-3.

Also as described above, the task scheduler 40 is configured to iteratively select a relocation request 25 from each the pending task queues 50-1, 50-2, 50-3 according to an iteration scheme such as a round-robin iteration scheme. Such description is by way of example only. In one arrangement, the system operator can dynamically adjust or configure the iteration scheme associated with the pending task queues 50-1, 50-2, 50-3. For example, the system operator can provide a modified iteration scheme instruction 84 to the task scheduler 40 to dynamically adjust the way in which the task scheduler 40 retrieves the data relocation requests 25 from the pending task queues 50-1, 50-2, 50-3. For instance, rather than a round-robin iteration scheme, the system operator can dynamically configure the task scheduler 40 with an iteration scheme based upon priority, where the task scheduler 40 accesses one pending task queue, such as the second pending task queue 50-2 more frequently than either the first or the third pending task queues 50-1, 50-3.

What is claimed is:

1. A method for scheduling a data relocation activity in a data storage system, comprising:
   retrieving, by a storage processor, a data relocation request from a selected pending task queue of a set of pending task queues, each pending task queue of the set of pending task queues having an associated, distinct grouping property and each pending task queue of the set of pending task queues having a set of assigned data relocation requests, the grouping property of each particular pending task queue corresponding to a data relocation request grouping property of each data relocation request assigned to that particular pending task queue;
   applying, by the storage processor, an acceptance threshold to the data relocation request, the acceptance threshold defining a limit to the data relocation requests processed by the storage processor; and
   when the data relocation request meets the acceptance threshold, forwarding, by the storage processor, the data relocation request to an ongoing task queue for execution of the data relocation request, otherwise maintaining the data relocation request in the selected pending task queue of the set of pending task queues.

2. The method of claim 1, wherein:
   applying the acceptance threshold to the data relocation request comprises comparing, by the storage processor, a total number of data relocation requests in the ongoing task queue to the acceptance threshold; and
   when the total number of data relocation requests falls below the acceptance threshold, forwarding, by the storage processor, the data relocation request to the ongoing task queue for execution of the data relocation request otherwise maintaining the data relocation request in the selected pending task queue of the set of pending task queues.

3. The method of claim 1, wherein:
   applying the acceptance threshold to the data relocation request comprises detecting, by the storage processor, a total number of data relocation requests in the ongoing task queue having a grouping property corresponding to the grouping property of the retrieved data relocation request and comparing, by the storage processor, the total number of data relocation requests in the ongoing task queue having the grouping property corresponding to the grouping property of the retrieved data relocation request to the acceptance threshold; and when the total number of data relocation requests in the ongoing task queue having a grouping property corresponding to the grouping property of the retrieved data relocation request falls below the acceptance threshold, forwarding, by the storage processor, the data relocation request to the ongoing task queue for execution of the data relocation request otherwise maintaining the data relocation request in the selected pending task queue of the set of pending task queues.

4. The method of claim 1, comprising:

receiving, by the storage processor, a modified acceptance threshold, the modified acceptance threshold defining a limit on data relocation requests processed by the storage processor distinct from the limit on data relocation requests processed by the storage processor defined by the acceptance threshold; and applying, by the storage processor, the modified acceptance threshold to the data relocation request.

5. The method of claim 1, comprising:

receiving, by the storage processor, a data relocation request from a client device;

comparing, by the storage processor, a data relocation request grouping property associated with the received data relocation request with the distinct grouping property of each pending task queue of the set of pending task queues; and when detecting a correspondence between the data relocation request grouping property associated with the received data relocation request and a distinct grouping property of a particular pending task queue of the set of pending task queues, allocating, by the storage processor, the received data relocation request to the particular pending task queue of the set of pending task queues, otherwise creating, by the storage processor, a pending task queue associated with the data relocation request grouping property associated with the received data relocation request and allocating the data relocation request to the created pending task queue of the set of task queues.

6. The method of claim 1, comprising iteratively retrieving, by the storage processor and for each pending task queue of the set of pending task queues, a data relocation request and applying the acceptance threshold to the data relocation request.

7. The method of claim 6, wherein retrieving, for each pending task queue of the set of pending task queues, the data relocation request and applying the acceptance threshold to the data relocation request comprises retrieving, by the storage processor and for each pending task queue of the set of pending task queues, the data relocation request and applying the acceptance threshold to the data relocation request according to an iteration scheme.

8. The method of claim 1, wherein forwarding the data relocation request to the ongoing task queue for execution of the data relocation request comprises:

selecting, by the storage processor, a data relocation request from the ongoing task queue; and removing, by the storage processor, the data relocation request from the ongoing task queue in response to a completion criterion.

9. The method of claim 8, comprising, in response to removing the data relocation request from the ongoing task queue, iteratively retrieving, by the storage processor, a data relocation request from each pending task queue of the set of pending task queues, and applying the acceptance threshold to the data relocation request.

10. The method of claim 1, comprising:

receiving, by the storage processor, a modified grouping property, the modified grouping property defining a partitioning of the received data relocation request into the pending task queues, the modified grouping property being distinct from the grouping property associated with each pending task queue of the set of pending task queues; and applying, by the storage processor, the modified grouping property to a received data relocation request.

11. The method of claim 1, comprising:

receiving, by the storage processor, a modified iteration scheme instruction, the modified iteration scheme instruction defining a retrieval scheme for the data relocation requests from the pending task queues, the modified iteration scheme instruction being distinct from an iteration scheme associated with each pending task queue of the set of pending task queues; and iteratively retrieving, by the storage processor and for each pending task queue of the set of pending task queues, a data relocation request according to the modified iteration scheme instruction.

12. An apparatus, comprising:

at least one communications interface; and a controller electrically coupled to the at least one communications interface wherein the controller is configured to:

retrieve a data relocation request from a selected pending task queue of a set of pending task queues, each pending task queue of the set of pending task queues having an associated, distinct grouping property and each pending task queue of the set of pending task queues having a set of assigned data relocation requests, the grouping property of each particular pending task queue corresponding to a data relocation request grouping property of each data relocation request assigned to that particular pending task queue;

apply an acceptance threshold to the data relocation request, the acceptance threshold defining a limit to the data relocation requests processed by the storage processor; and when the data relocation request meets the acceptance threshold, forward the data relocation request to an ongoing task queue for execution of the data relocation request, otherwise maintain the data relocation request in the selected pending task queue of the set of pending task queues.

13. The apparatus of claim 12, wherein:

when applying the acceptance threshold to the data relocation request, the controller is configured to compare a total number of data relocation requests in the ongoing task queue to the acceptance threshold; and when the total number of data relocation requests falls below the acceptance threshold, the controller is configured to forward the data relocation request to the ongoing task queue for execution of the data relocation request, otherwise maintain the data relocation request in the selected pending task queue of the set of pending task queues.

14. The apparatus of claim 12, wherein:

when applying the acceptance threshold to the data relocation request, the controller is configured to detect a total number of data relocation requests in the ongoing task queue having a grouping property corresponding to the grouping property of the retrieved data relocation request and to compare the total number of data relocation requests in the ongoing task queue having the grouping property corresponding to the grouping property of the retrieved data relocation request to the acceptance threshold; and when the total number of data relocation requests in the ongoing task queue having a grouping property corresponding to the grouping property of the retrieved data relocation request falls below the acceptance threshold, the controller is configured to forward the data relocation request to the ongoing task queue for execution of the data relocation request, otherwise maintain the data relocation request in the selected pending task queue of the set of pending task queues.

15. The apparatus of claim 12, wherein the controller is configured to:
receive a modified acceptance threshold, the modified acceptance threshold defining a limit on of data relocation requests processed by the storage processor distinct from the limit on the data relocation requests processed by the storage processor defined by the acceptance threshold; and
apply the modified acceptance threshold to the data relocation request.

16. The apparatus of claim 12, wherein the controller is configured to:
receive a data relocation request from a client device;
compare a data relocation request grouping property associated with the received data relocation request with the distinct grouping property of each pending task queue of the set of pending task queues; and
when detecting a correspondence between the data relocation request grouping property associated with the received data relocation request and a distinct grouping property of a particular pending task queue of the set of pending task queues, the controller is configured to allocate the received data relocation request to the particular pending task queue of the set of pending task queues, otherwise create a pending task queue associated with the data relocation request grouping property associated with the received data relocation request and allocating the data relocation request to the created pending task queue of the set of task queues.

17. The apparatus of claim 12, wherein the controller is configured to iteratively retrieve, for each pending task queue of the set of pending task queues, a data relocation request and applying the acceptance threshold to the data relocation request.

18. The apparatus of claim 17, wherein when retrieving, for each pending task queue of the set of pending task queues, the data relocation request and applying the acceptance threshold to the data relocation request, the controller is configured to retrieve, for each pending task queue of the set of pending task queues, the data relocation request and applying the acceptance threshold to the data relocation request according to an iteration scheme.

19. The apparatus of claim 12, wherein when forwarding the data relocation request to the ongoing task queue for execution of the data relocation request, the controller is configured to:
select a data relocation request from the ongoing task queue; and
remove the data relocation request from the ongoing task queue in response to a completion criterion.

20. The method of claim 19, wherein in response to removing the data relocation request from the ongoing task queue the controller is configured to iteratively retrieve a data relocation request from each pending task queue of the set of pending task queues, and applying the acceptance threshold to the data relocation request.

21. A computer program product having a non-transitory computer-readable storage medium including computer program logic encoded thereon that, when performed on a controller of an apparatus, causes the apparatus to:
retrieve a data relocation request from a selected pending task queue of a set of pending task queues, each pending task queue of the set of pending task queues having an associated, distinct grouping property and each pending task queue of the set of pending task queues having a set of assigned data relocation requests, the grouping property of each particular pending task queue corresponding to a data relocation request grouping property of each data relocation request assigned to that particular pending task queue;
apply an acceptance threshold to the data relocation request, the acceptance threshold defining a limit to the data relocation requests processed by the storage processor; and
when the data relocation request meets the acceptance threshold, forward the data relocation request to an ongoing task queue for execution of the data relocation request, otherwise maintain the data relocation request in the selected pending task queue of the set of pending task queues.

* * * * *